United States Patent
Sams et al.

(10) Patent No.: US 10,913,013 B2
(45) Date of Patent: *Feb. 9, 2021

(54) SYSTEM AND METHOD TO PROCESS EFFLUENT BRINE AND INTERFACE RAG FROM AN OIL DEHYDRATION/DESALTING SYSTEM

(71) Applicant: Cameron International Corporation, Houston, TX (US)

(72) Inventors: Gary W. Sams, Spring, TX (US); Ronald D. Hypes, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1398 days.

This patent is subject to a terminal disclaimer.

(21) Appl. No.: 14/997,877

(22) Filed: Jan. 18, 2016

(65) Prior Publication Data
US 2016/0129373 A1    May 12, 2016

Related U.S. Application Data

(63) Continuation of application No. 14/556,987, filed on Dec. 1, 2014, now Pat. No. 9,238,183, which is a
(Continued)

(51) Int. Cl.
*C02F 1/24* (2006.01)
*C02F 9/02* (2006.01)
(Continued)

(52) U.S. Cl.
CPC ....... *B01D 21/0024* (2013.01); *B01D 21/009* (2013.01); *B01D 21/0084* (2013.01);
(Continued)

(58) Field of Classification Search
CPC .... C02F 1/24; C02F 1/008; C02F 1/40; C02F 1/001; C02F 2101/32; C02F 2103/365;
(Continued)

(56) References Cited

U.S. PATENT DOCUMENTS 3,623,608 A    11/1971    Waterman
4,251,361 A    2/1981    Grimsley
(Continued)

FOREIGN PATENT DOCUMENTS

DE    9313340    11/1993
JP    48-073366    9/1973
(Continued)

OTHER PUBLICATIONS

"International Search Report and Written Opinion of the International Searching Authority", dated Dec. 7, 2012.
UK IPO, "Office Action/Search Report", dated May 16, 2018.

*Primary Examiner* — Thomas M Lithgow
(74) *Attorney, Agent, or Firm* — Hauptman Ham, LLP; Ronald G. Embry, Jr.

(57) ABSTRACT

A system and method for processing interface emulsion, water, and solids contained within a separator vessel that comprises the steps of continually extracting those components from the vessel and then passing them through a gas flotation cell. The cell, which is preferably a vertical induced gas flotation cell, separates the oil and water contained in the interface emulsion and discharges recovered oil from an upper portion of the cell and treated water from a bottom portion of the cell. The recovered oil and treated water may be further processed and recycled to the vessel or sent elsewhere. The treated water may also be recycled to the cell or sent to a process sewer. Fuel gas residing in an upper
(Continued)

portion of the cell may be cooled and passed through a splitter. All the steps of occur in a closed system with no air emissions.

15 Claims, 2 Drawing Sheets

Related U.S. Application Data continuation of application No. 13/248,919, filed on Sep. 29, 2011, now Pat. No. 8,900,460.

(51) Int. Cl.

| B01D 21/00 | (2006.01) |
|---|---|
| C02F 1/00 | (2006.01) |
| B03D 1/14 | (2006.01) |
| B03D 1/24 | (2006.01) |
| B01D 21/30 | (2006.01) |
| C02F 1/40 | (2006.01) |
| C02F 101/32 | (2006.01) |
| C02F 103/36 | (2006.01) |
| C02F 9/00 | (2006.01) |

(52) U.S. Cl.
CPC ............ *B01D 21/30* (2013.01); *B03D 1/1418* (2013.01); *B03D 1/1475* (2013.01); *B03D 1/24* (2013.01); *C02F 1/008* (2013.01); *C02F 1/24* (2013.01); *C02F 1/40* (2013.01); *B03D 1/1456* (2013.01); *C02F 1/001* (2013.01); *C02F 9/00* (2013.01); *C02F 2101/32* (2013.01); *C02F 2103/365* (2013.01); *C02F 2209/02* (2013.01); *C02F 2209/42* (2013.01); *C02F 2301/046* (2013.01)

(58) Field of Classification Search
CPC ............ C02F 2209/02; C02F 2209/42; C02F 2301/046; C02F 9/00; B01D 21/0024; B01D 21/0084; B01D 21/009; B01D 21/30; B03D 1/1418; B03D 1/24; B03D 1/1475; B03D 1/1456
USPC .............................................. 210/703, 221.2
See application file for complete search history.

(56) References Cited

U.S. PATENT DOCUMENTS

| 4,257,895 | A | 3/1981 | Murdock |
| 4,428,841 | A | 1/1984 | Favret, Jr. |
| 4,889,638 | A | 12/1989 | Rockford et al. |
| 5,073,266 | A | 12/1991 | Ball, IV |
| 5,580,463 | A | 12/1996 | Hubred |
| 5,840,183 | A | 11/1998 | Bakker |
| 7,157,007 | B2 | 1/2007 | Frankiewicz et al. |
| 8,900,460 | B2 * | 12/2014 | Sams ................ C02F 1/24 208/187 |
| 9,238,183 | B2 * | 1/2016 | Sams ................ C02F 1/24 |
| 2005/0150840 | A1 | 7/2005 | Vion |

FOREIGN PATENT DOCUMENTS

| JP | 49-119875 | 11/1974 |
| JP | 49-130368 | 12/1974 |
| JP | 50-117063 | 9/1975 |
| JP | 51-147063 | 12/1976 |
| JP | 55-165108 | 12/1980 |
| JP | 57-150405 | 9/1982 |
| JP | 02-031802 | 2/1990 |
| JP | 06-134207 | 5/1994 |
| JP | 08-196809 | 8/1996 |
| JP | 2000107508 | 4/2000 |
| JP | 2001162106 | 6/2001 |
| JP | 2008155104 | 7/2008 |
| JP | 2011521780 | 7/2011 |
| WO | 0024493 | 5/2000 |
| WO | 20090144441 | 12/2009 |

* cited by examiner

SYSTEM AND METHOD TO PROCESS EFFLUENT BRINE AND INTERFACE RAG FROM AN OIL DEHYDRATION/DESALTING SYSTEM

REFERENCE TO PENDING APPLICATIONS

This application is a continuation application of U.S. patent application Ser. No. 14/556,987 filed Dec. 1, 2014, which was a continuation application claiming priority to U.S. patent application Ser. No. 13/248,919 filed Sep. 29, 2011, the contents of which are hereby incorporated by reference in their entirety.

FIELD OF INVENTION

The present invention relates to a method for removing immiscible matter from liquid, particularly for separating oil, oil-coated solids, or oil and oil-coated solids from oily water. The invention also relates to a method to reduce the dissolved BTEX (benzene, toluene, ethyl-benzene, and xylene) from the oily water. For purposes of disclosing the present invention "oily water" refers to any water that is contaminated by dispersed oil droplets, oil-coated solids, or other hydrophobic contaminants.

BACKGROUND OF THE INVENTION

In many industries, including oil, paper and pulp, textiles, and food processing, various processes produce contaminated water as a by-product. This is especially true in crude oil production and refining because substantially all crude oil is produced from subterranean formations which contain water. This produced water is by the far the largest volume product or waste stream associated with oil and gas production and it presents challenges and costs to operators. Because the water cannot be disposed of by simply dumping it into the environment, numerous methods and systems have been devised to reduce the contaminant content of the water to a level that permits its discharge into the environment without any deleterious consequences.

The basic method of separating a mixture of oil and water is by use of gravity. For this purpose, separators are frequently employed at the point where the crude oil first reaches the earth's surface. These separators range from rather unsophisticated holding vessels—which simply provide an enclosed container wherein the oil and water mixture can rest with reduced turbulence, thereby allowing the oil to float to an upper part of the vessel and water to settle to a lower part of the vessel—to more sophisticated vessels that apply desalting and dehydration methods. Regardless of the type of vessel used, it is common for oil-coated solids ("mud") to accumulate in the bottom of the vessel and for a mixture of oil and water ("emulsion" or "rag") to form at the oil and water interface.

Removal of the solids and the emulsion from the vessel is problematic. The customary practice is to allow the solids and emulsion to accumulate until their presence begins to interfere with the overall performance of the vessel. At this point in time, the vessel is shut down so that the solids and emulsion can be extracted and then conveyed to another location for cleaning and processing. Because this batch extraction method disrupts both the oil and water separation process and the production process, a need exists for a method of removing the solids and emulsion on a continuous basis while also processing those contaminants at the source. This processing should occur with equipment that comprises a relatively small footprint.

The processing of these contaminants is also problematic. For example, effluent water often contains organic species that have a high partition coefficient and benzene. Efficient removal of these organic species causes problems for refiners in their waste water treatment operations and difficulty in meeting discharge permit requirements. Current benzene extraction unit designs require high volumes of steam pressure and are prone to fouling from heavy hydrocarbon entrainment in the effluent water. Additionally, the effluent water may contain heavy hydrocarbon interface emulsion that can settle in a refinery process sewer and cause plugging and flow restriction problems. Cleaning processes that remove those restrictions can cause leaks and loss of containment integrity. Hydrocarbon and solids entering the process sewer immediately takes on a hazardous waste designation. Therefore, a need exists for a reliable and efficient method to remove organic species, benzene, and heavy hydrocarbon emulsion from the effluent water so that the treated water discharged to the process sewer meets environmental requirements.

BRIEF SUMMARY OF THE INVENTION

This invention provides a method for continual processing of interface emulsion, water, and solids contained within a separator vessel. The method comprises the steps of setting removal rates for the interface emulsion, water, and solids; extracting the interface emulsion, water, and solids from the vessel according to those rates, and then passing the interface emulsion, water, and solids through a gas flotation cell. The cell, which is preferably a vertical induced gas flotation cell, separates the oil and water contained in the interface emulsion and discharges the recovered oil from an oil outlet located in an upper portion of the cell and treated water from a water outlet located in a bottom portion of the cell. All the steps of the method comprise a closed system with no air emissions. For example, gas residing in an upper portion of the vessel may be treated and recycled to the cell or sent elsewhere for further processing and use.

To provide for improved control of vessel performance, a thickness of the interface emulsion layer may be monitored within the vessel and the removal rates set to maintain the thickness of the layer at a pre-determined value. Additionally, a level of the interface emulsion layer may be monitored and the removal rates set to maintain the level at a pre-determined value. In cases in which a rather large vessel is involved, multiple extraction points may be included within the vessel. Isolation and control valves may be used to sequence and control the removal of one or more of the interface emulsion, water, and solids The interface emulsion, water, and solids extracted from the vessel may enter the cell as two or more streams, or may be combined into a single stream. To aid in separation, a reverse emulsion breaker may be injected into the single stream. Upon being processed in the cell, the oil and lighter solids (fines) exit an upper portion of the cell and the water and heavier solids exit a bottom portion of the cell. A portion of the water exiting the cell may be recycled to the cell and may be recycled to the vessel to keep solids from settling within the vessel. The water being recycled to the vessel may be further filtered so that the water entering the vessel is substantially clean water.

The oil exiting the cell may also be recycled back to the vessel or sent elsewhere for further processing or use.

Additionally, a desalting chemical may be injected into the oil at high concentration for inline mixing. Similarly, gas residing in an upper portion of the cell is recovered and may be cooled and passed through a splitter to separate high boiling components from the gas. The recovered gas may then be recycled to the cell or sent elsewhere for further processing or use.

A better understanding of the invention will be obtained from the following description and claims taken in conjunction with the attached drawings.

DETAILED DESCRIPTION OF THE PREFERRED EMBODIMENTS

Figure 1:
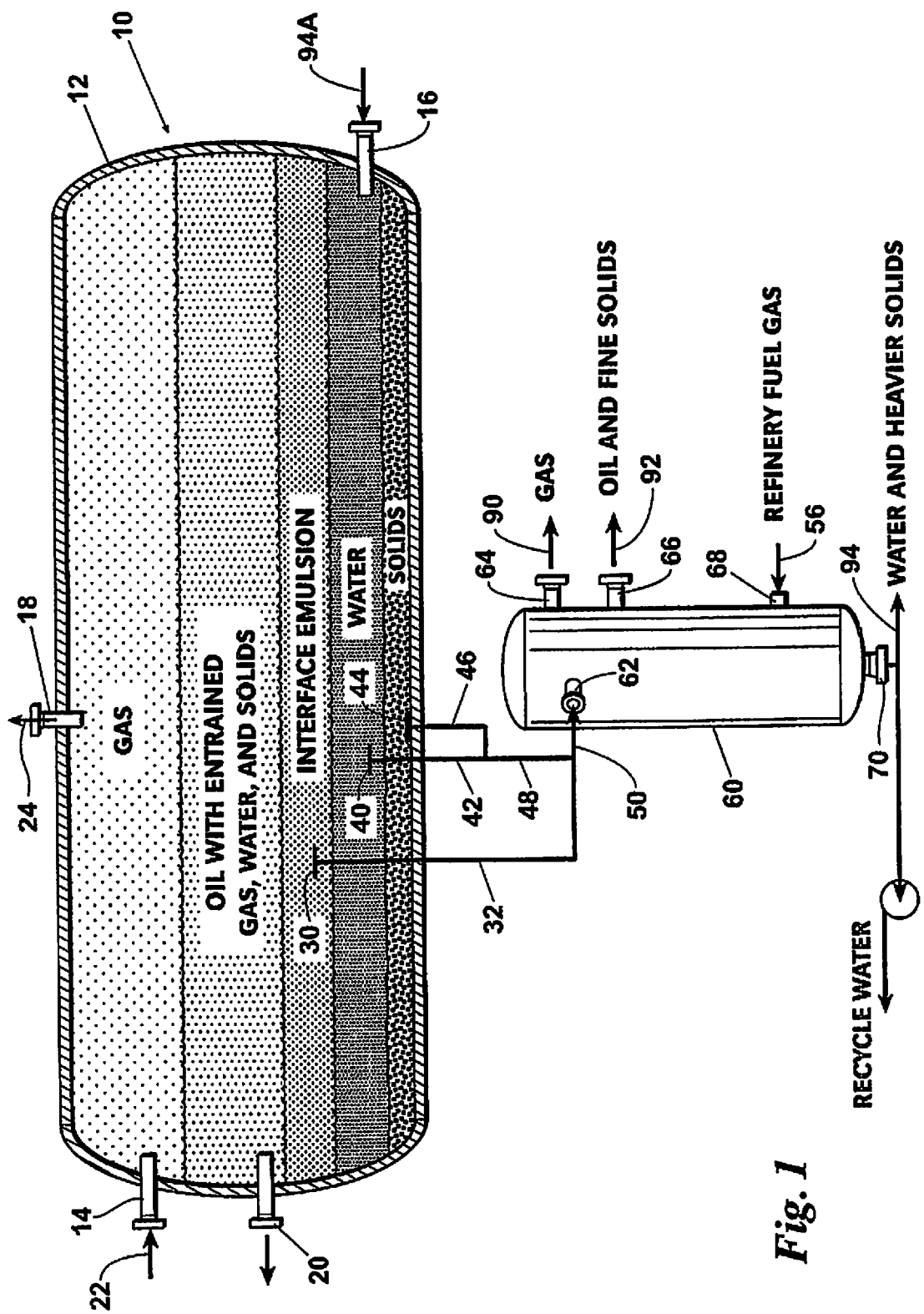
FIG. 1 is a view of the relationship between a separation vessel comprising extraction points for interface emulsion, water, and solids and connected to a gas flotation cell designed to clean the emulsion, water, and solids for recycling, discharge, or further processing.

The present invention discloses a method for continual processing of interface emulsion, water, and solids from a separator vessel such as an oil dehydration vessel or an oil desalting vessel. Referring first to FIG. 1, a system 10 comprising a separator vessel 12 is connected by conventional piping to a gas flotation cell 60. The separator vessel 12 is of a type well-known in the art and commonly used in crude oil production and refining for dehydration and desalting of crude oil. Gas flotation cell 60 is also of a type well-known in the art and commonly used for cleaning the water being held or processed in separator vessel 12. A gas flotation cell suited for use in the method described herein is that of Frankiewicz et al., U.S. Pat. No. 7,157,007. In a preferred embodiment of the method, a National Tank Company Dual Polarity® Electrostatic Treater was used as the vessel 12 and a National Tank Company Tridair™ Versaflo™ vertical gas induced flotation cell was used as the cell 60.

A crude oil stream 22 containing entrained gas, water, and solid contaminants enters vessel 12 through an inlet 14. Vessel 12 typically holds those components—and may process them in some way—so that the oil might separate from the contaminants. The separated oil is then removed from vessel 12 through an outlet 20. During the separation process, it is common for oil coated solids, called mud, to accumulate in a bottom portion of vessel 12 and for a layer comprising a mixture of oil and water, called interface emulsion or rag, to form in an intermediate portion of vessel 12. The water accumulates between the layer of solids and the layer of interface emulsion. The oil accumulates above the interface emulsion, and the gas, in turn, typically accumulates above the oil in an upper portion of vessel 12. In a preferred embodiment, the gas contained in the upper portion of vessel 12 enters an outlet 18 and travels along path 24 for further processing, thereby eliminating the need to vent the gas contained in vessel 12. Similarly, the method of extracting, treating, and discharging the interface emulsion, water, and solids (as described below) occurs in a closed system with no air emissions.

A customary practice in treating the interface emulsion, water, and solids is to permit the solids and interface emulsion to accumulate until their presence begins to interfere with the performance of vessel 12. Batch extraction methods are then employed to remove these contaminants. Removing the solids and the interface emulsion in this manner, however, disrupts the separation, dehydration, and desalting process, thereby disrupting the crude oil production or refining process.

To provide for the continuous, rather than batch, removal of the interface emulsion, water, and solids, vessel 12 is provided with interior extraction points 30, 40, and 44. Interface emulsion enters extraction point 30 and exits vessel 12 along path 32. The removal of the interface emulsion may be determined by a pre-determined value, and the emulsion removal rate may vary over time. The water and solids enter extraction points 40 and 44, respectively, and exit the vessel along paths 42 and 46, respectively. Similar to the interface emulsion removal rate, the water and solids removal rate may be determined by a pre-determined value. The water and solids removal rate may also vary over time, and the water removal rate may be different than the solids removal rate.

In cases in which vessel 12 is rather large, two or more extraction points 30 may be provided for removal of the interface emulsion. Removal of the interface emulsion would then be accomplished through the use of one or more isolation valves (not shown) and one or more flow control valves (not shown). Similarly, two or more extraction points 40, 44 may be provided for the removal of water and solids with appropriate isolation and flow control valves employed.

The interface emulation removal rate and the water and solids removal rate are controlled by instrumentation (not shown) located on vessel 12. In a preferred embodiment, an interface probe (not shown) determines the thickness of the emulsion layer and an interface control 34 sets the interface emulsion removal rate in order to maintain the thickness of the emulsion layer at a pre-determined value (see FIG. 2). Similarly, in another preferred embodiment, a level probe (not shown) monitors the location of the interface emulsion layer so that a level control 52 sets the water and solids removal rate in order to maintain the location of the interface emulsion at a pre-determined value.

The interface emulsion stream 32, the water stream 42, and the solids stream 46 may enter cell 60 as two or more separate streams or may be combined into a single stream. In a preferred embodiment, the water and solids, upon exiting vessel 12, combine as a water and solids stream 48. Water and solids stream 48 then combines with interface emulsion stream 32 to form a single contaminants stream 50. The interface emulsion, water, and solids contained in stream 48 may be injected with a reverse emulsion breaker 54 to aid in separating the oil and water contained in stream 48 prior to it entering cell 60 (see FIG. 2).

Contaminants stream 48 enters an inlet 62 located in an upper portion of cell 60. A detailed description of the operation of a gas flotation cell similar to cell 60 is found in U.S. Pat. No. 7,157,007. In general terms, flotation includes dispersing gas in the form of fine bubbles into the contaminant stream 48. As the gas bubbles rise upwardly, they associate with oil droplets or other hydrophobic contaminants to cause the contaminants to rise to the surface of the water. In some cell configurations, gas (such as air or gas derived from the mixture itself) is injected directly into a lower portion of the vessel to disperse within the vessel and to thereby assist in the flotation of contaminants. However, a more preferred system is to employ a dispersion of fine gas bubbles in water that is introduced into the flotation vessel.

Major factors that impact the efficiency of a gas flotation process are: (1) oil droplet/contaminant diameter; (2) gas bubble diameters; and (3) true liquid residence time in the cell. Generally, as gas bubble diameters decrease—that is, become smaller, the efficiency of the flotation process increases. However, there is always a trade-off in that for flotation to be practiced in a practical manner the bubbles must be sufficiently large to overcome any downward fluid velocity in the flotation cell. Thus, for a vertical column flotation cell with, as an example, a net average downward water velocity of 2 feet per minute, a gas bubble will need to have a diameter greater than about 100 microns in order to retain a net upward movement in cell 60 based upon Stokes Law.

Figure 2:
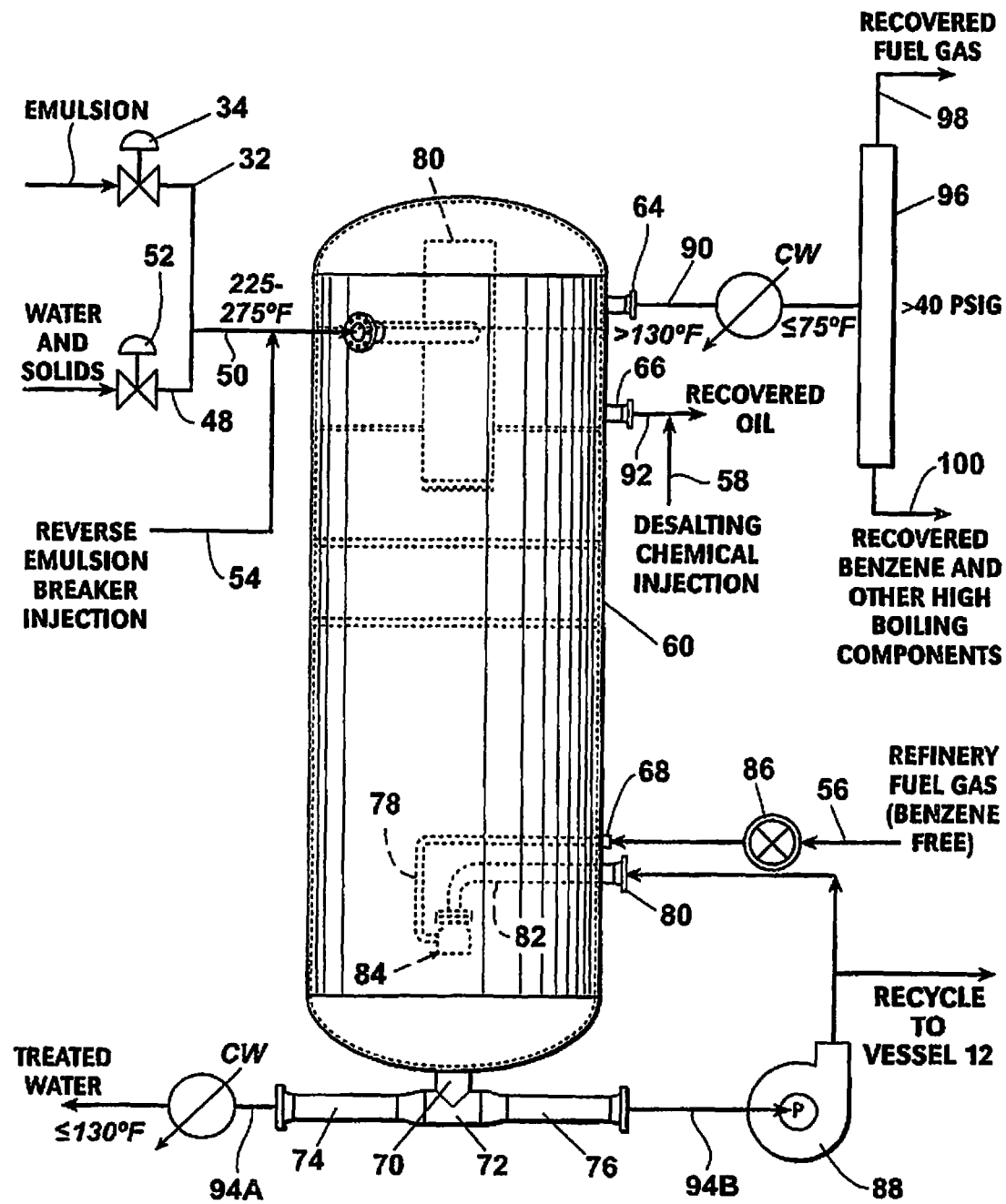
FIG. 2 is a schematic depicting the input and output streams of the gas flotation cell.

In a preferred embodiment, the interface emulsion, water, and solids contained in stream 50 enter a centrally positioned cylindrical inlet device 80 as illustrated by FIG. 2. Because stream 50 enters tangentially into the interior of cylinder 80, a cyclonic motion results and heavier components migrate toward the interior of cylinder 80 and move downwardly.

Simultaneously, a refinery fuel gas stream 56 passes through a compressor 86 and enters cell 60 through an inlet 68 located at a bottom portion of cell 60. Fuel gas stream 56 then travels through an interior pipe 78 and enters an eductor 84. A treated water stream 94B may be passed through a pump 88 and recycled to cell 60. The recycled treated water stream 94B enters cell 60 through inlet 80 and then travels thorough an interior pipe 82 to eductor 84. Gas bubbles are then produced by eductor 84.

As the gas bubbles rise in cell 60, the bubbles collide with and cling to oil droplets entrained in the interface emulsion, water, and solids stream 50. The oil droplets and fine solids float upwardly with the gas bubbles and are removed from cell 60 as a recovered oil stream 92 through an outlet 66. The recovered oil stream 92 may be further treated with a desalting chemical 58 at high concentration via online mixing and may also be recycled back to a raw crude charge of vessel 12 without upsetting the operation of vessel 12. Fuel gas collecting at an upper portion of cell 60 is removed as fuel gas stream 90 through an outlet 64. Because the system strips benzene, fuel gas stream 90 contains extracted hydrocarbons like benzene, toluene, ethyl-benzene and xylene. Fuel gas stream 90 may be subsequently cooled, passed through a splitter 96, and separated into gas 98 and liquid components 100. The recovered fuel gas 98 may then be recycled to cell 60 or sent elsewhere. Water containing heavy solids exits the bottom of cell 60 as a treated water stream 94 through outlet 70. The treated water stream 94 is low in benzene. Outlet 70 may be connected to a tee 72, with a portion of treated water stream 94 entering pipe 74 (stream 94A) and a portion entering pipe 76 (stream 94B). The treated water stream 94A may be cooled and sent to a process sewer. The treated water stream 94A being discharged to the process sewer is at or substantially near atmospheric conditions. Treated water stream 94B may be recycled to vessel 12. In recycling the treated water stream 94B to vessel 12, a portion of the stream 94B may be directed into an inlet 16 located at a bottom portion of vessel 12 (see FIG. 1) in order to keep the solids from settling within vessel 12. Additional filtering may be required so that the treated water stream 94B entering vessel 12 is substantially clean water. The treated water stream 94B may be recycled into cell 60 by pump 88.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method for processing interface emulsion, water, and solids contained within a separator vessel comprising the steps of:
    extracting the interface emulsion, water, and solids from at least one discrete extraction point for each, the extraction points being located within the separator vessel; and
    treating the extracted interface emulsion, water, and solids in an induced gas flotation cell arranged downstream of the separator vessel.

2. The method according to claim 1 wherein the extracting step occurs at a first removal rate for the interface emulsion and at a second removal rate for at least one of the water and the solids.

3. The method according to claim 2 wherein at least one of the first and second removal rates is a continuous removal rate.

4. The method according to claim 2 further comprising the step of setting the first removal rate and the second removal rate to maintain a thickness of the interface emulsion at a pre-determined value.

5. The method according to claim 1 further comprising the extracting step including the sequencing removal of the interface emulsion, water, and solids.

6. The method according to claim 1 further comprising the step of combining at least two of the extracted interface emulsion, water, and solids into a single stream.

7. The method according to claim 6 further comprising the step of injecting a reverse emulsion breaker into the single stream.

8. The method according to claim 1 further comprising the step of recycling a portion of at least one of an oil stream and a water stream being discharged from the induced gas flotation cell back to the separator vessel.

9. A system for processing interface emulsion, water, and solids contained within a separator vessel, the system comprising:
    an interface emulsion extraction point, a solids extraction point, and a water extraction point located at discrete locations within the separator vessel; and
    an induced gas flotation cell arranged downstream of the separator vessel to receive interface emulsion, water, and solids removed from the separator vessel through a respective extraction point.

10. A system according to claim 9 further comprising the interface emulsion extraction point being at a first removal rate and at least one of the water and solids extraction points being at a second removal rate.

11. A system according to claim 10 wherein at least one of the first and second removal rates is a continuous removal rate.

12. A system according to claim 10 wherein the first removal rate and the second removal rate are set to maintain a thickness of the interface emulsion at a pre-determined value.

13. A system according to claim 9 further comprising one or more valves to sequence removal of the interface emulsion, water, and solids from the separator vessel according to a respective removal rate.

14. A system according to claim 9 wherein at least two of the interface emulsion, the water and the solids removed from the separator vessel are combined into a single stream.

15. A system according to claim 9 further comprising a recycling loop wherein a portion of at least one of the oil and the water discharged from the induced gas flotation cell is recycled to the separator vessel.

\* \* \* \* \*